US006831886B1

(12) United States Patent
Yamasaki et al.

(10) Patent No.: US 6,831,886 B1
(45) Date of Patent: Dec. 14, 2004

(54) OPTICAL HEAD AND OPTICAL HEAD DEVICE

(75) Inventors: Hiroyuki Yamasaki, Amagasaki (JP);
Yasushi Kobayashi, Itami (JP);
Manami Kuiseko, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/448,467

(22) Filed: Nov. 24, 1999

(30) Foreign Application Priority Data

Nov. 27, 1998 (JP) ............................................. 10-337671
Mar. 23, 1999 (JP) ............................................. 11-077460

(51) Int. Cl.[7] ................................................. G11B 7/00
(52) U.S. Cl. ............................ 369/112.28; 369/112.27; 369/112.29; 369/13.33
(58) Field of Search ........................ 369/112.27, 112.28, 369/112.29, 13.33

(56) References Cited

U.S. PATENT DOCUMENTS

| | | | | |
|---|---|---|---|---|
| 4,656,618 A | * | 4/1987 | Kaku et al. ................... | 369/112 |
| 4,710,911 A | * | 12/1987 | Yamada et al. .............. | 369/100 |
| 5,226,029 A | * | 7/1993 | Takanashi et al. ........... | 369/100 |
| 5,311,496 A | * | 5/1994 | Whitehead .................... | 369/112 |
| 5,859,814 A | | 1/1999 | Kino et al. | |
| 5,874,726 A | * | 2/1999 | Haydon ........................ | 250/201.1 |
| 6,016,301 A | * | 1/2000 | Takasawa et al. ........... | 369/112 |
| 6,034,797 A | * | 3/2000 | Ju et al. ........................ | 359/15 |
| 6,130,779 A | * | 10/2000 | Carlson et al. .............. | 359/566 |
| 6,154,326 A | | 11/2000 | Ueyanagi et al. | |
| 6,185,056 B1 | * | 2/2001 | Nishiwaki et al. .......... | 359/837 |
| 6,188,132 B1 | * | 2/2001 | Shih et al. .................... | 257/724 |
| 6,215,756 B1 | * | 4/2001 | Shimano et al. ........ | 369/112.26 |
| 6,275,453 B1 | | 8/2001 | Ueyanagi et al. | |
| 6,320,708 B1 | | 11/2001 | Ueyanagi et al. | |
| 6,320,841 B1 | * | 11/2001 | Watanabe et al. ............ | 369/300 |
| 6,327,238 B1 | * | 12/2001 | Nishiwaki et al. ..... | 369/112.21 |
| 6,377,535 B1 | * | 4/2002 | Chen et al. ............ | 369/112.09 |

OTHER PUBLICATIONS

Objective Lenses for DVD & Near Field Optical Disk Pick–Up by Chul Woo Lee et al. Optical System Lab Corporate Technical Operation, SamSung Electronics Co., Ltd TuP 1 ODF '98, Tokyo Jun. 16, 1998.

* cited by examiner

*Primary Examiner*—Gautam R. Patel
(74) *Attorney, Agent, or Firm*—Morrison & Foerster LLP

(57) ABSTRACT

An optical head which has a prism with an incident section, an internal reflective surface and an emergent surface, and an optical head device which employs the optical head. Light emitted from a light source is incident to the prism through the incident section, reflects at least once on the internal reflective surface and is converged in the vicinity of the emergent surface. Then, the light effuses through the emergent surface as near field light.

14 Claims, 19 Drawing Sheets

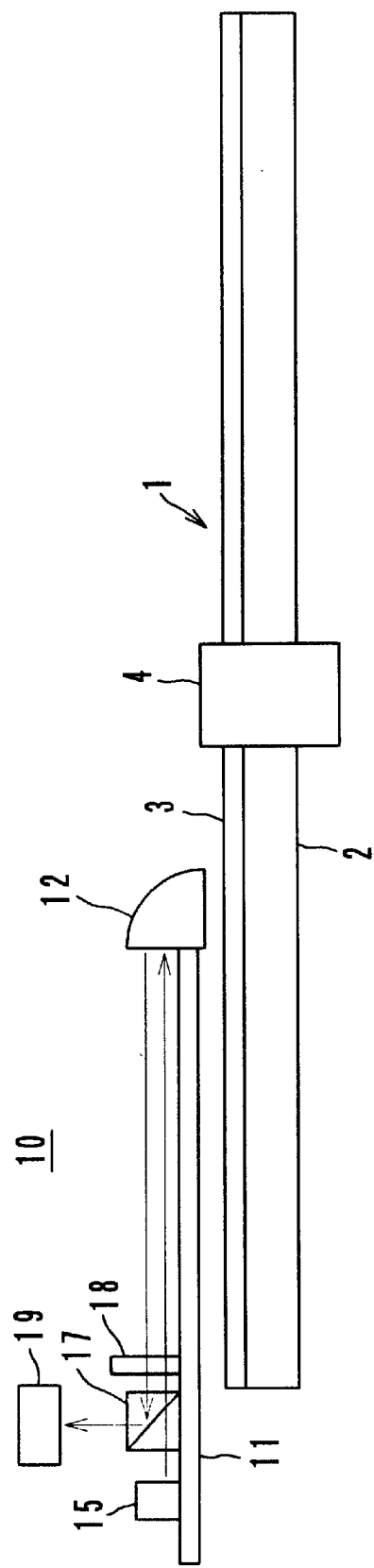

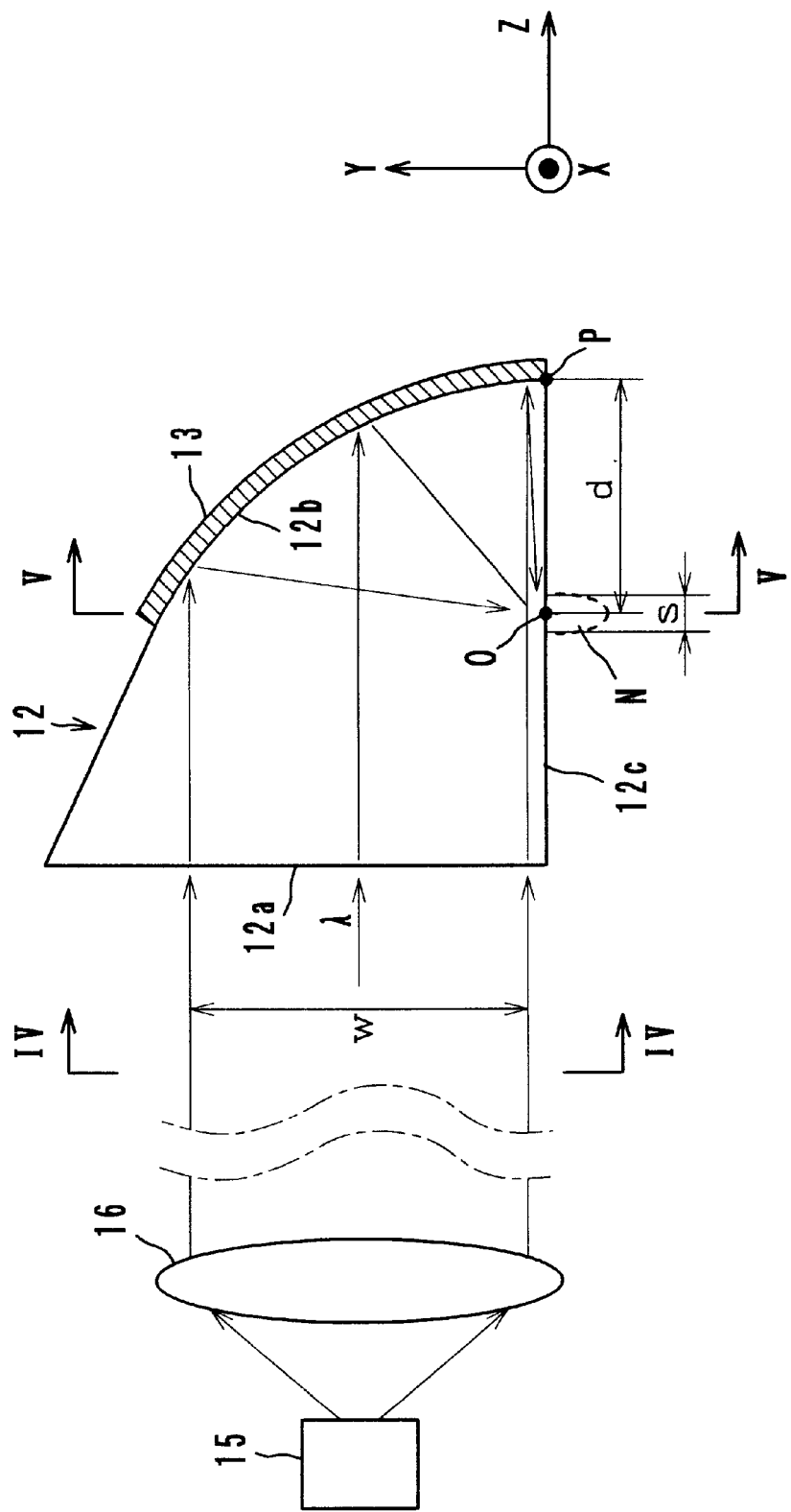
F I G. 3

F I G. 6
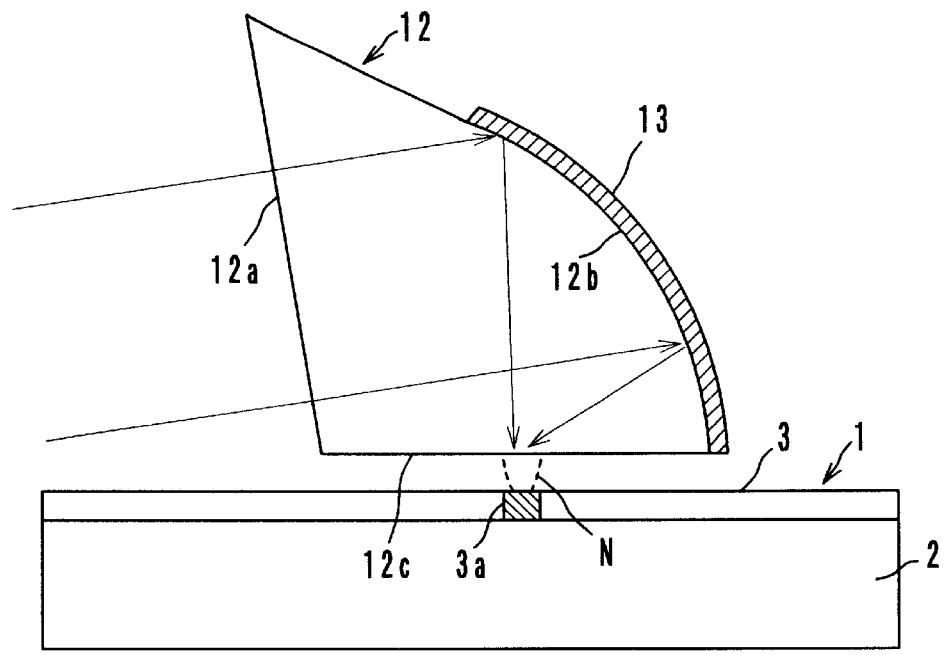
F I G. 7
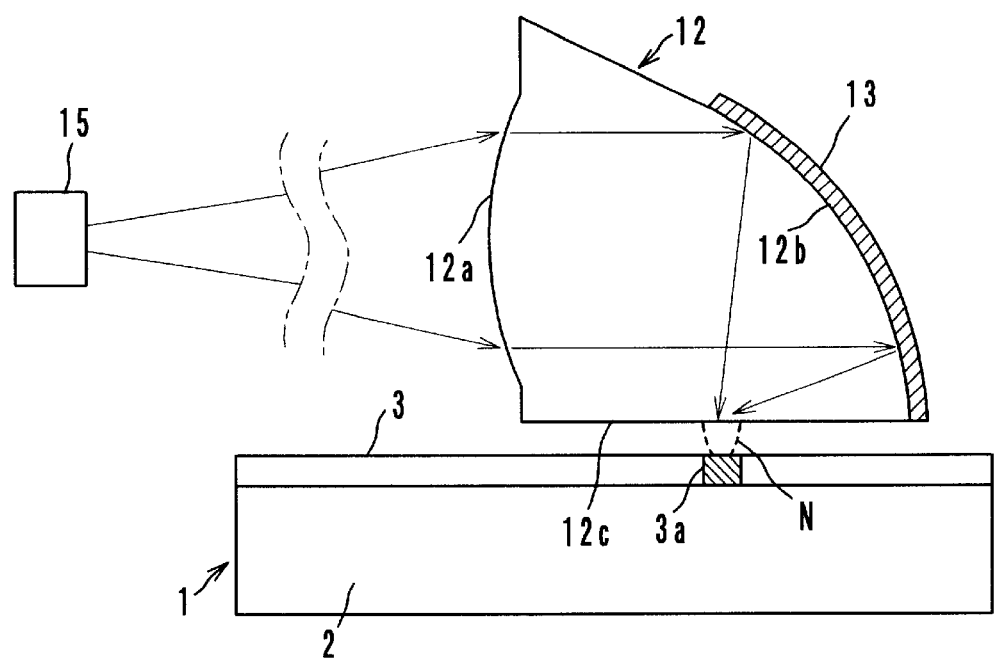

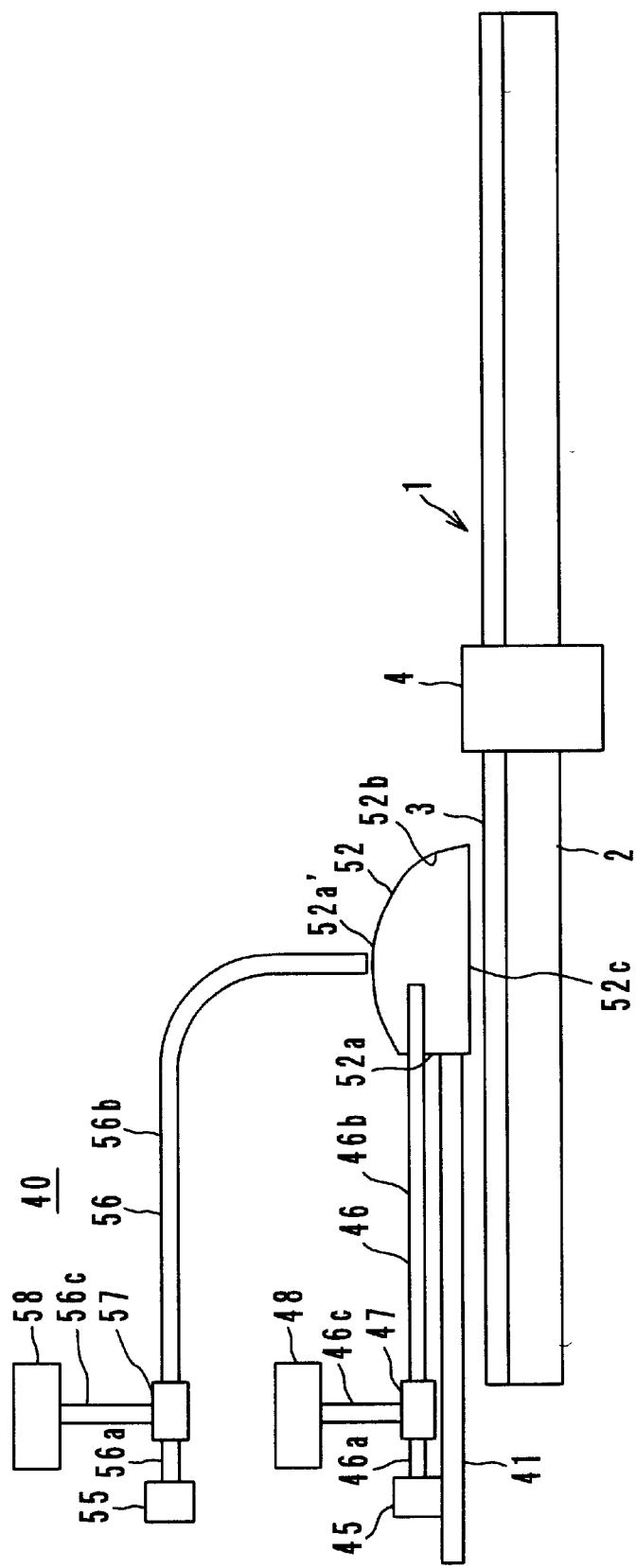

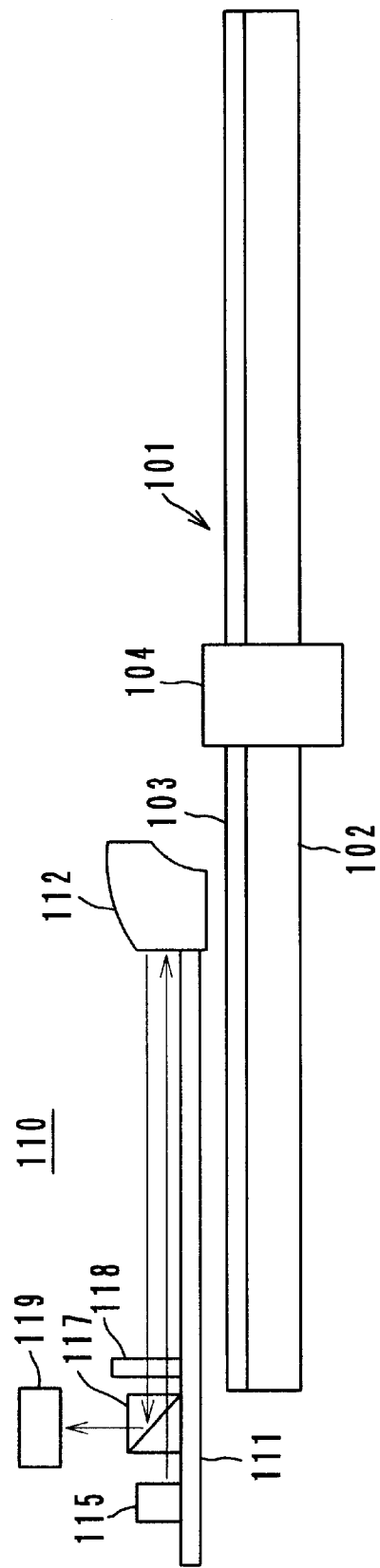

F I G. 1 6
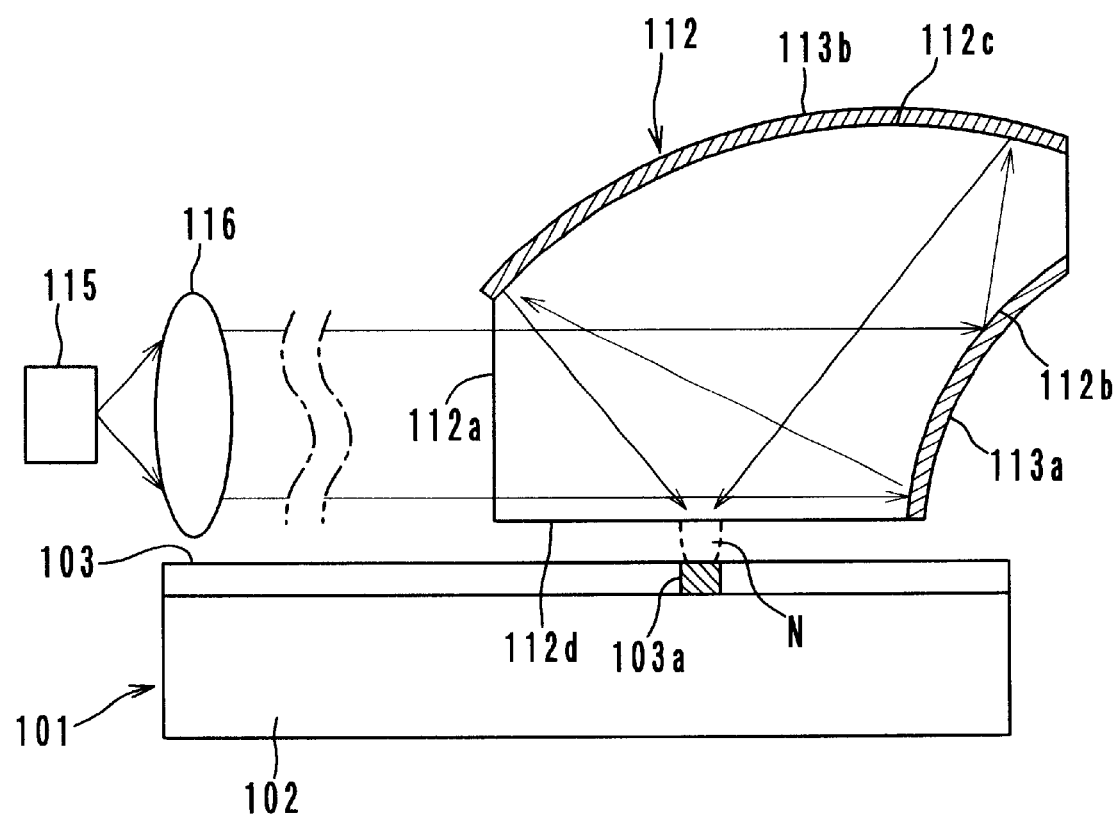

F I G. 1 8
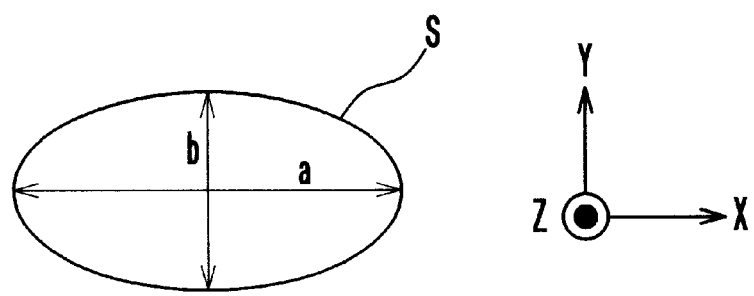
F I G. 1 9
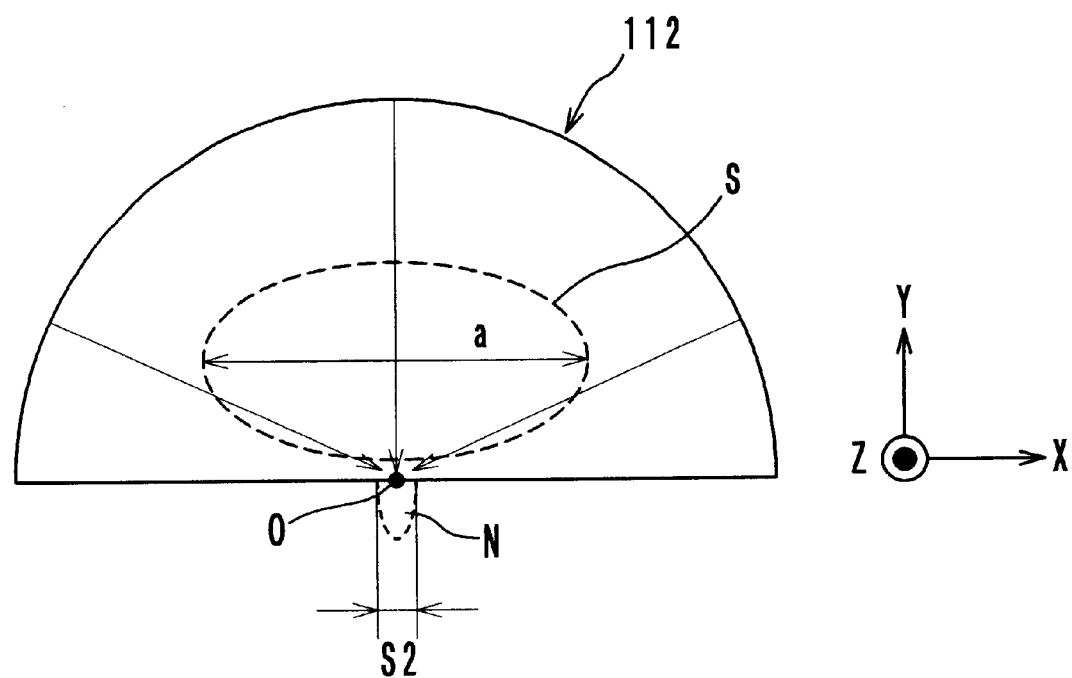

F I G. 2 2
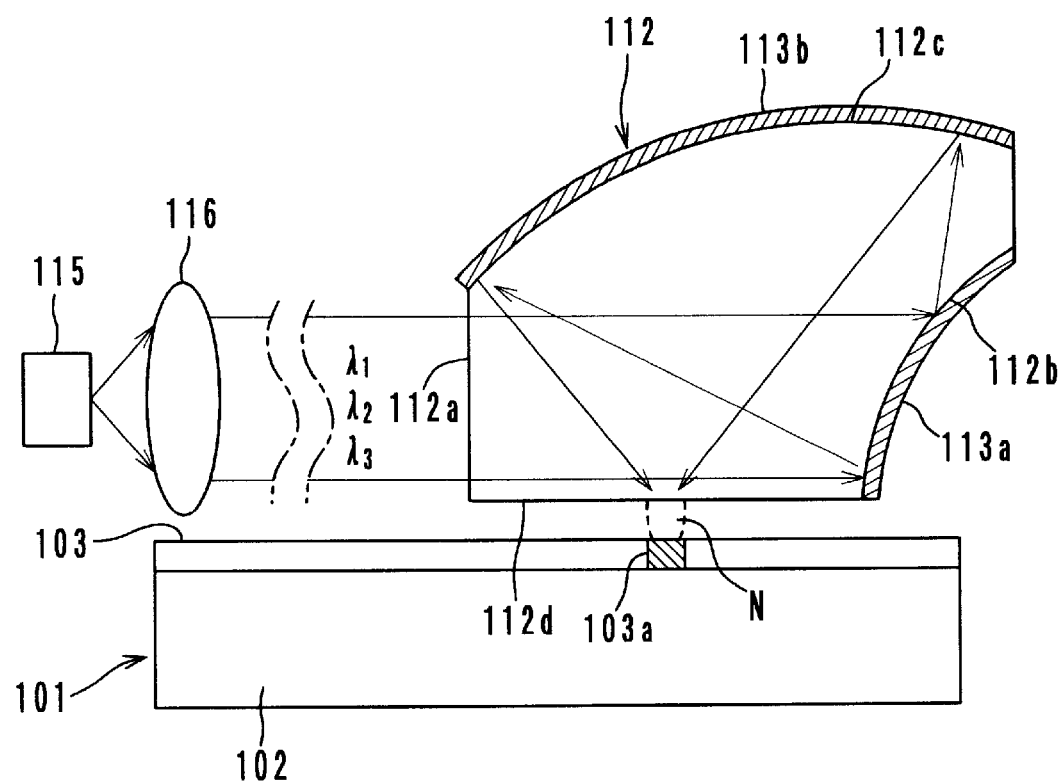

OPTICAL HEAD AND OPTICAL HEAD DEVICE

This application is based on application Nos. 10-337671 and 11-077460 filed in Japan, the content of which is hereby incorporated by reference.

BACKGROUND OF THE INVENTION

1. Field of the Invention

The present invention relates to an optical head and an optical head device, and more particularly to an optical head which is suited to be used for high-density recording/reading/erasing of information to or from an optical recording medium and an optical head device using this optical head.

2. Description of Related Art

In the art of optical memories which optically record and read information, in recent years, with speed-up of computer processing and development of multimedia, high-density devices which are capable of recording an extremely large volume of information are demanded, and in order to comply with the demand, a near field optical recording technique is suggested. In a conventional optical memory using a laser beam, the recording density is limited depending on the diffraction limit of light, and such an optical memory can record and read marks of sizes at least light wavelength (several hundred nanometers). A recently proposed optical memory which uses near field optics radiates light to a recording medium (optical disk) for recording/reading with the optical head and the recording medium arranged at an interval of only some dozen nanometers. At this time, the optical memory uses a fiber probe with a minuscule aperture smaller than light wavelength and a solid immersion lens. Thereby, in spite of the diffraction limit, it becomes possible to record and read minuscule marks of some dozen nanometers.

In a conventional memory which uses propagated light, such as a CD, a DVD, an MO or the like, a convergent lens, a mirror, a prism and other optical elements are installed in the optical head, and the optical head is large and heavy. It is, therefore, difficult to adopt an air floating method based on the air lubricating principle, which is generally adopted in magnetic recording heads, in such an optical memory. In the above-mentioned optical head using a solid immersion lens, although the solid immersion lens itself is small and light, it is necessary to further use a convergent lens, which indispensably increases the size and weight.

Lately, "Objective Lenses for DVD & Near Field Optical Disk Pickup" ODF'98, Tokyo, Jun. 16, 1998 suggests an SIM (solid immersion mirror) which does not require a convergent lens. This SIM converges light by performing refraction once and reflection twice in a prism. Since this eliminates the necessity of using a convergent lens, an optical head using this SIM is small and light. However, because the SIM uses a coaxial optical system, the design is strongly limited. Also, since a direction of light incident to the SIM is perpendicular to a recording surface, a mirror for bending optical path of incident light is required. Accordingly, vibration and shift of the mirror must be adjusted, which obstructs reduction of the size and weight of the optical head device.

SUMMARY OF THE INVENTION

An object of the present invention is to provide a small and light optical head.

Another object of the present invention is to provide an optical head device of which optical system can be designed freely.

Another object of the present invention is to provide an optical head device in which light has only a small loss.

Another object of the present invention is to provide a near field optical head which is suited to make a gap from a recording medium by an air floating method.

Another object of the present invention is to provide an optical head which is capable of correcting spherical aberration when a parallel bundle of rays is incident thereto.

Another object of the present invention is to provide an optical head which is capable of using a divergent bundle of rays as incident light thereto.

Another object of the present invention is to provide an optical head which is capable of recording, reading and erasing information at a higher density by reducing the diameter of a near field light beam.

Another object of the present invention is to provide an optical head device which is strong against external vibration and shock.

Another object of the present invention is to provide an optical head device which records, reads and erases information by use of either one selected from near field light and propagated light.

Another object of the present invention is to provide an optical head device which uses a non-coaxial optical system.

In order to attain the objects, an optical head device according to the present invention comprises: a first light source which emits light; and a prism which receives the light emitted from the first light source as first incident light, reflects the first incident light inside at least once and emits the first incident light in a direction different from a direction in which the first incident light was incident thereto.

A prism according to the present invention comprises: an incident section which receives incident light; a first surface which reflects the incident light received by the incident section in the prism; and a second surface through which the light reflected by the first surface is emergent from the prism for reading of information.

Another prism according to the present invention comprises: an incident section which receives incident light; a first surface which reflects the incident light received by the incident section in the prism; a second surface which reflects the light reflected by the first surface in the prism in a direction which is different from a direction in which the incident light was received by the incident section; and a third surface through which the light reflected by the second surface is emergent from the prism for reading of information.

Another prism according to the present invention uses near field light occurring on an emergent surface for recording, reading and erasing of information, and the prism comprises an internal reflective surface which reflects light which was incident to the prism inside and converges the light on a vicinity of the emergent surface. In this prism, a non-coaxial optical system is formed.

According to the present invention, light of a specified wavelength which was incident to a prism through an incident section is reflected inside at least once and is converged on an emergent surface. Then, the light effuses through the emergent surface as near field light (in other words, optical near field). By use of this near field light, recording, reading and erasing of information are carried out. According to the present invention, an optical head can be composed of only a prism. Accordingly, the optical head is small and light and has a simple optical system. Also, an air floating method can be adopted in making a gap between the optical head and a recording medium.

BRIEF DESCRIPTION OF THE DRAWINGS

These and other objects and features of the present invention will be apparent from the following description with reference to the accompanying drawings, in which:

FIG. 1 is a schematic structural view of an optical head device which is a first embodiment of the present invention;

FIG. 3 is an illustration which shows travel of light in a prism;

FIG. 6 is a schematic structural view of a modification of the first embodiment;

FIG. 7 is a schematic structural view of another modification of the first embodiment;

FIG. 14 is a schematic structural view of an optical head device which is a fifth embodiment of the present invention;

FIG. 15 is a schematic structural view of an optical head device which is a sixth embodiment of the present invention;

FIG. 16 is an illustration which shows of an occurrence of near field light in the sixth embodiment;

FIG. 18 is an illustration which shows an incident light beam spot, which is a sectional view cut along "X VIII—X VIII" in FIG. 17;

FIG. 19 is an illustration which shows an incident light beam spot and an occurrence of near field light, which is a sectional view cut along "XIX—XIX" in FIG. 17;

FIG. 22 is a schematic structural view of an optical head device which is a seventh embodiment of the present invention;

DETAILED DESCRIPTION OF THE PREFERRED EMBODIMENTS

Preferred embodiments of an optical head and an optical head device according to the present invention are described with reference to the accompanying drawings.

First Embodiment; See FIGS. 1, 2 and 3

Figure 2:
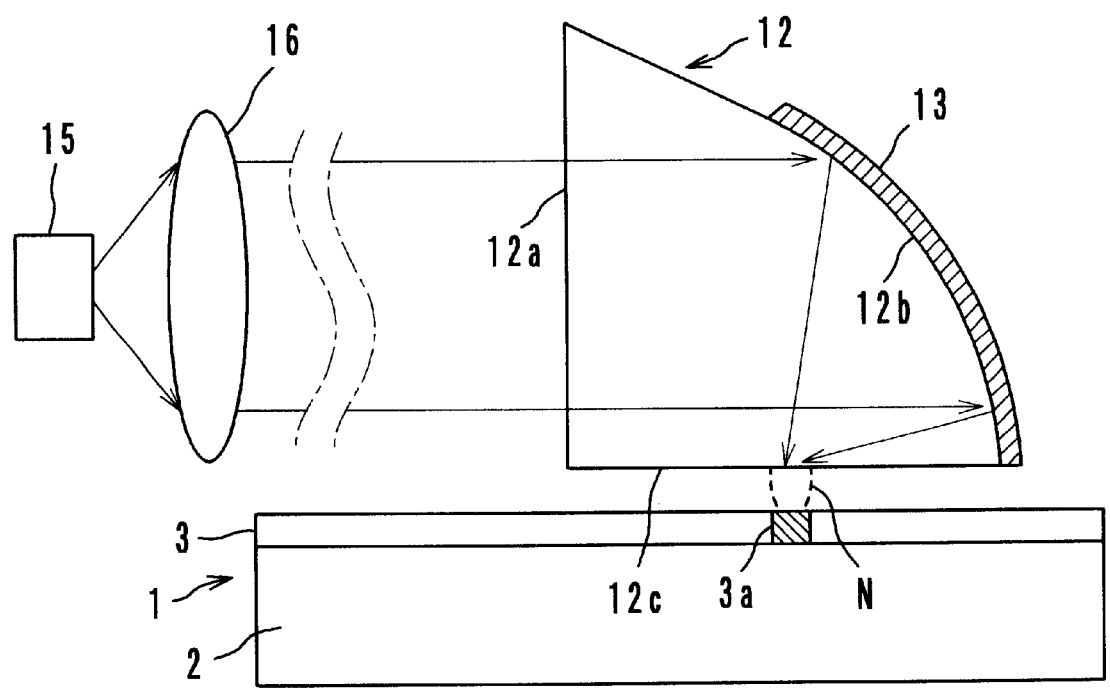
FIG. 2 is an illustration which shows an occurrence of near field light in the first embodiment.

In FIGS. 1 and 2, the number 1 denotes a recording medium, and the number 10 denotes an optical head device. The recording medium 1 has a recording layer 3 on a substrate 2 and can be driven to rotate on a rotary driving shaft 4. A protective layer may be formed on the recording layer 3.

The optical head device 10 has a prism 12 serving as an optical head at the end of an arm 11. On the arm 11, a light source 15, a collimator lens 16 (see FIG. 2), a polarizing beam splitter 17, a $\lambda/4$ wavelength plate 18, an optical detector 19 are provided. The prism 12 has an incident surface 12a, an internal reflective surface 12b and an emergent surface 12c. The incident surface 12a and the emergent surface 12c are plane, and the internal reflective surface 12b is a paraboloid of revolution, of which top is an end P of the surface 12b (see FIG. 3). This internal reflective surface 12b is made by forming a reflective material 13 such as Au, Ag, Cu, Cr, Ni, Al or the like into a film. The prism 12 is made of, for example, glass such as LaSF, LaF, BaSF, etc. The prism 12 is a high-refractive medium and at least has a higher refractive index than the medium which is in contact with the emergent surface 12c.

The light source 15 may be a laser diode, an LED or any other light emitting source.

First, a recording process is described. Light of a wavelength $\lambda$ emitted from the light source 15 is changed into a parallel bundle of rays by the collimator lens 16, and the parallel bundle of rays is incident to the prism 12 via the polarizing beam splitter 17 and the $\lambda/4$ wavelength plate 18. The incident light is reflected by the reflective surface 12b only once and is converged on the emergent surface 12c. Then, the light effuses through the emergent surface 12c as a near field light (in other words, optical near field) N. The gap between the emergent surface 12c and the recording layer 3 of the recording medium 1 is set not more than ¼ of the wavelength $\lambda$ (50 to 100 nm), so that the near field light N irradiates the recording layer 3 and forms a recording pit 3a thereon.

The spot diameter s of the near field light N (see FIG. 3) is substantially equal to that of the light beam as if still traveling in the prism 12 and is substantially $1/n$ (n: refractive index of the prism 12) of that of the light beam when traveling in the air. Referring to FIG. 3, if the wavelength $\lambda$ of the incident light is 630 nm, if the refractive index n of the prism 12 is 1.8, if the beam diameter w of the incident light (the parallel bundle of rays) is 1 mm and if the distance d between the converging point O of the prism 12 and the end P of the prism 12 is 0.7 mm, the spot diameter s of the near field light N is approximately 370 nm, and the recording density at this time is approximately 3.5 Gbit/inch$^2$, which is extremely high.

Because the internal reflective surface 12b of the prism 12 is a paraboloid of revolution of which top is the end P of the prism 12, this surface has a function of correcting spherical aberration of a parallel bundle of rays.

Next, a reading process is described. As has been described in connection with the recording process, the near field light N irradiates the recording layer 3 on the recording pit 3a. In this process, the near field light N is reflected by the recording layer 3, and the reflected light travels backward. The reflected light is emergent from the prism 12 through the incident surface 12a, passes through the λ/4 wavelength plate 18 again and is reflected by the beam splitter 17. Then, the light is received by the optical detector 19. Thereby, a reading signal of the recording pit 3a can be obtained. Because of the λ/4 wavelenth plate 18, the reflected light is securely directed to the optical detector 19 without returning to the light source 15, whereby the reading signal can be obtained in good conditions. The power of the light source 15 for reading may be weaker than that for recording. Erasing is carried out in a similar process; if necessary, however, the wavelength of light may be changed.

In the first embodiment, incident light to the prism 12 is internally reflected once and is converged on the emergent surface 12c, which causes a near field light N to effuse therethrough to carry out recording, reading or erasing. The head is composed of only the prism 12, and neither a convergent lens nor a reflective mirror is necessary. Consequently, the head is small and light and can be floated based on the air lubricating principle. Because the light is reflected in the prism 12 only once, the loss of light is small. Because the light has only a small loss in the prism 12 and because neither a convergent lens nor a reflective mirror is necessary, the freedom of the design of the optical system is large.

The Shape of the Incident Beam Spot; See FIGS. 4 and 5

Figure 4:
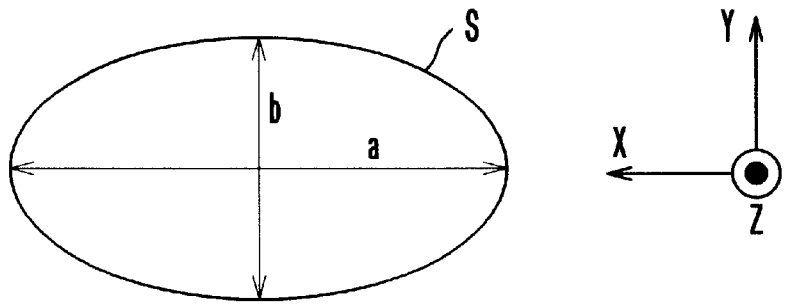
FIG. 4 is an illustration which shows an incident light beam spot, which is a sectional view cut along "IV—IV" in FIG. 3.
Figure 5:
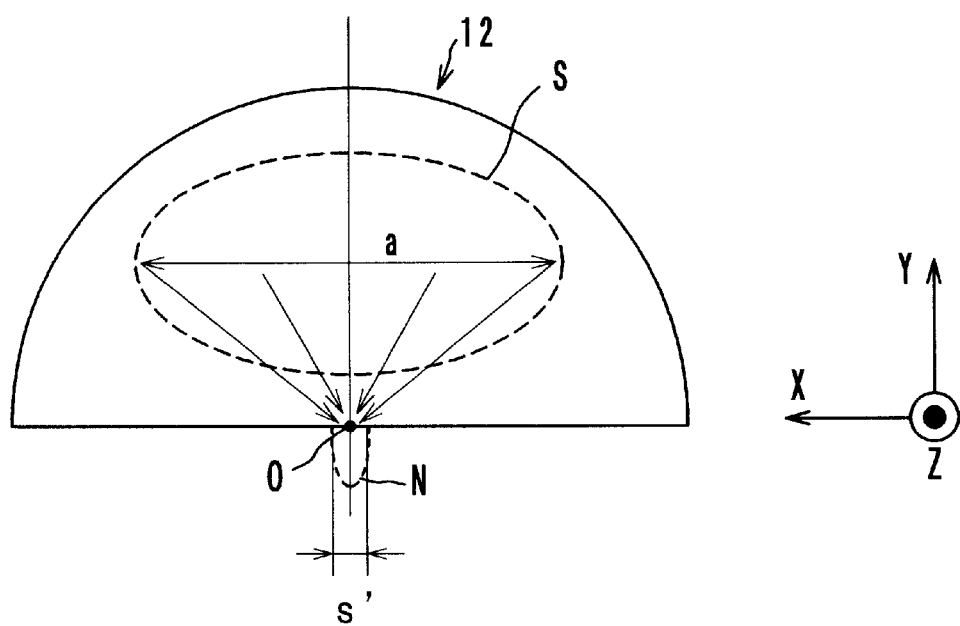
FIG. 5 is an illustration which shows an incident light beam spot and an occurrence of near field light, which is a sectional view cut along "V—V" in FIG. 3.

The incident beam spot is preferably elliptical as indicated by "S" in FIGS. 4 and 5. FIG. 4 is the section cut along the line "IV—IV" in FIG. 3, and FIG. 5 is the section cut along the line "V—V" in FIG. 3. The longer axis of the beam spot S extends in the X direction, and the prism 12 has a larger numerial aperture in the X direction. Accordingly, the diameter s' of the beam spot on the converging point O in the X direction (see FIG. 5) is smaller than the diameter s in the Z direction (see FIG. 3).

Now, a specific example is given, referring to FIG. 4. If the longer axis a and the shorter axis b of the incident beam spot S is 1.5 mm and 1 mm, respectively, and if the distance d is 0.7 mm, the spot diameter s in the Z direction is approximately 370 nm, while the spot diameter s' in the X direction is approximately 240 nm. Accordingly, if the X direction corresponds to the circular direction (recording direction) of the recording medium 1, the recording density is improved.

Modifications of the First Embodiment

FIG. 6 shows a modification of the first embodiment. In this modification, light is incident to the prism 12 from slightly downward, not in parallel to the surface of the recording medium 1. The incident surface 12a of the prism 12 is slightly tilted so as to be perpendicular to the incident light. By making the light incident to the prism 12 from slightly downward, the numerical aperture of the prism 12 on the emergent surface 12c becomes larger, and accordingly, the spot diameter on the converging point O becomes smaller.

FIG. 7 shows another modification of the first embodiment. In this modification, the collimator lens 16 shown in FIG. 2 is omitted, and a divergent bundle of rays is incident to the prism 12. The incident surface 12a of the prism 12 is convex and converges the incident divergent light into a parallel bundle of rays.

Figure 8:
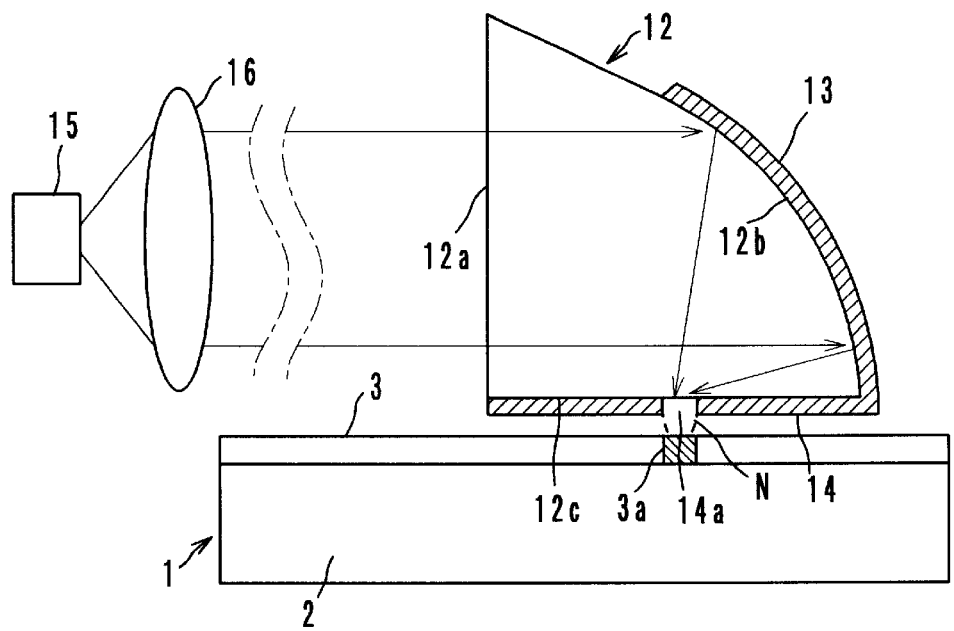
FIG. 8 is a schematic structural view of another modification of the first embodiment.

FIG. 8 shows another modification of the first embodiment. In this modification, a minuscule opening 14a is made at the converging point on the emergent surface 12c of the prism 12. Specifically, a light shutter film 14 is covered on the emergent surface 12c, and at the converging point, a minuscule opening 14a is made in the light shutter film 14. The light shutter film 14 may be made of the same material of the reflective film 13. By providing the minuscule opening 14a, the spot of the near filed light N can be made smaller, which permits higher-density recording.

Second Embodiment; See FIG. 9

In the second embodiment, for recording, reading and erasing, light of a wavelength $\lambda_1$, light of a wavelength of $\lambda_2$ and light of a wavelength of $\lambda_3$ are used, respectively. The second embodiment is of the same structure as the first embodiment. The light source 15 has light emitting sources which emit light of a wavelength $\lambda_1$, light of a wavelength of $\lambda_2$ and light of a wavelength of $\lambda_3$, respectively and switches these light emitting sources for recording, reading and erasing to emit the light of the respective wavelengths toward the prism 12.

In this case, the recording layer 3 is preferably a photochromic medium. As a specific example, 1,2-bis (2,4,5-trimethyl-3-thienyl)-cis-1,2-dicyanoethene (trade name, made by Tokyo Chemical Industry Co., Ltd.) can be named. For such a recording layer 3, light of 355 nm is used for recording; light of 532 nm is used for reading; and light of 780 nm is used for erasing.

Recording, reading and erasing in the second embodiment are carried out in the same processes as described in the first embodiment except that it is necessary to switch the wavelength of light.

Third Embodiment; See FIGS. 10 and 11

The third embodiment is a compatible optical head device which has a prism 22 so as to carry out recording, reading and erasing not only by a near field light but also by a propagated light beam. Accordingly, this device also can be used to record, read and erase information to and from conventional optical disk media such as CDs, DVDs, etc. by use of a propagated light beam.

Figure 10:
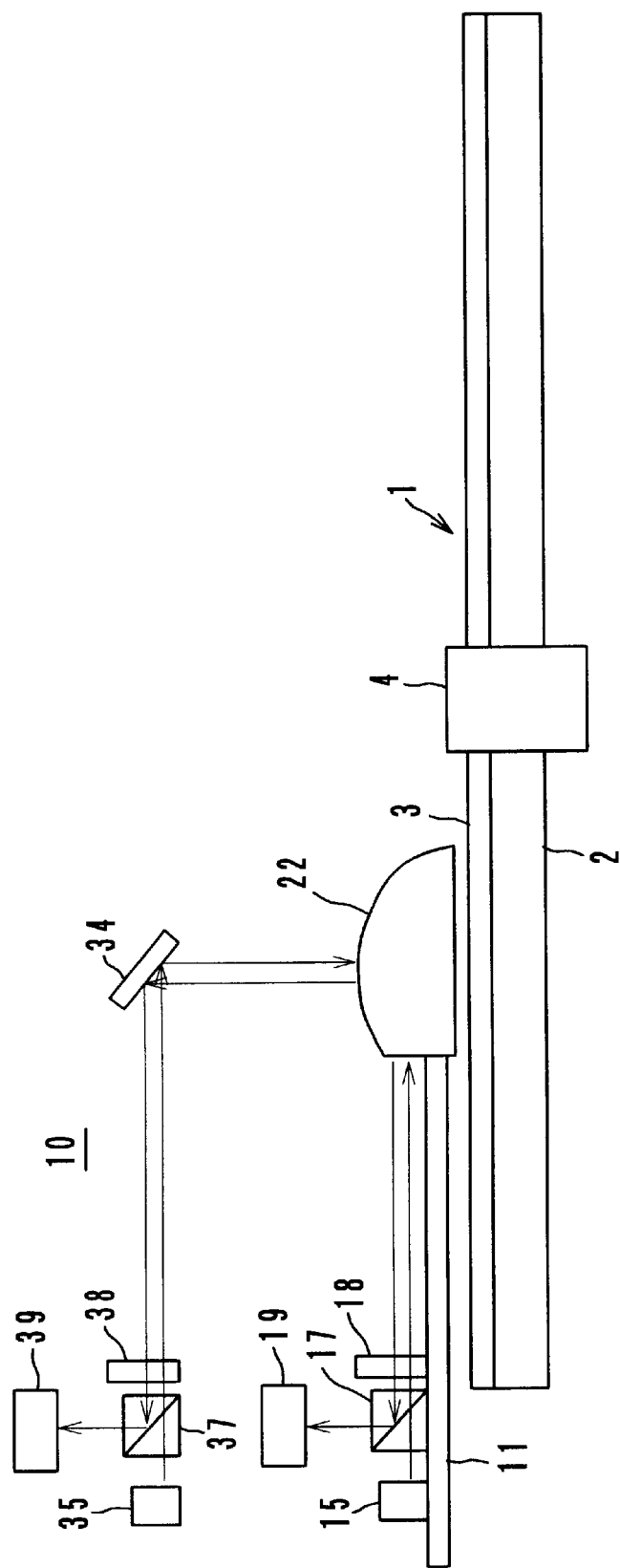
FIG. 10 is a schematic structural view of an optical head device which is a third embodiment of the present invention.
Figure 11:
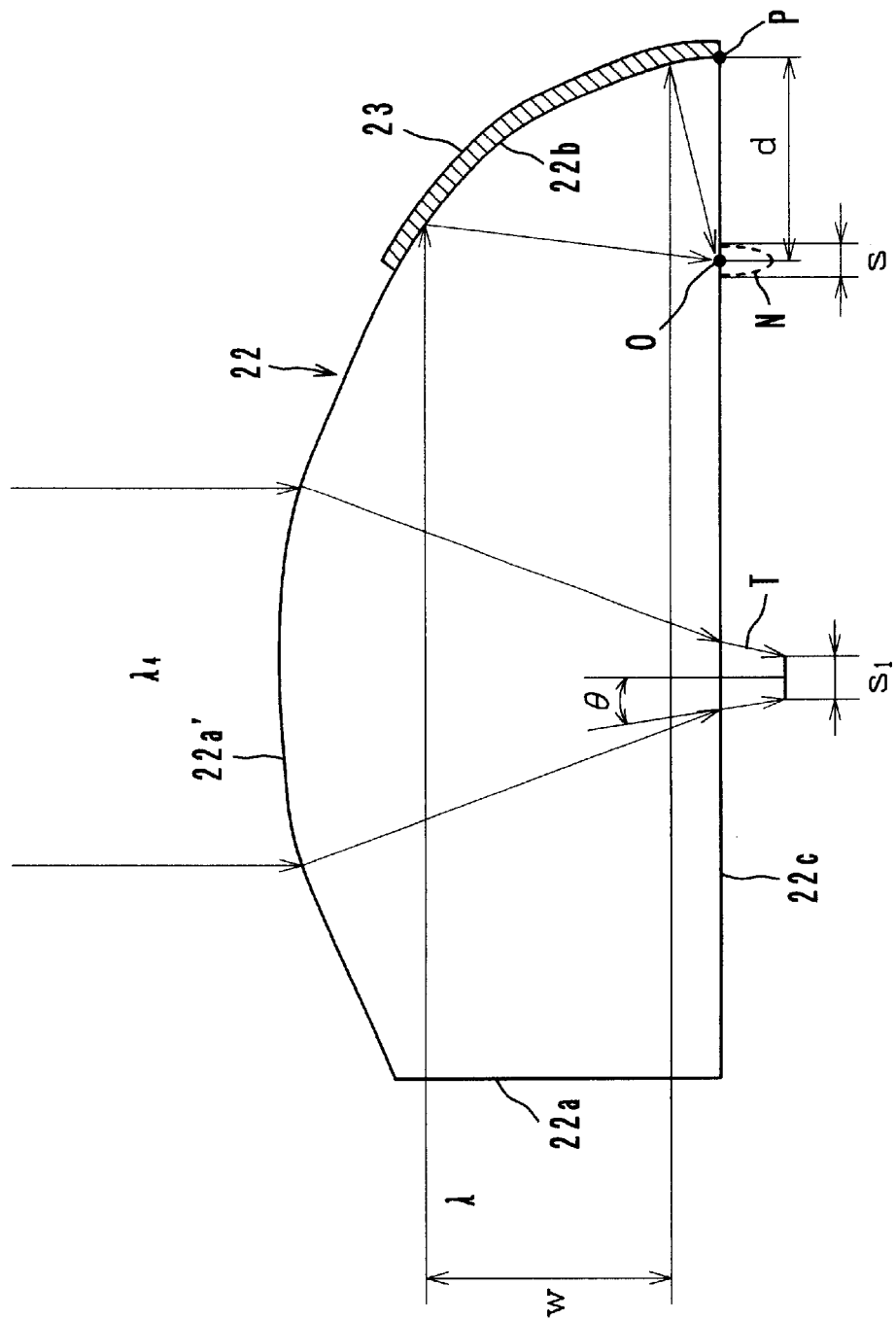
FIG. 11 is an illustration which shows travel of light in a prism in the third embodiment.

The head using a near field light is basically of the same structure as that of the first embodiment, and in FIG. 10, the same members are denoted by the same reference symbols as in FIG. 1. Referring to FIG. 11, the prism 22 has an incident surface 22a and an internal reflective surface 22b on which a reflective film 23 is formed. A near field light N effuses through an emergent surface 22c at a converging point 0. The internal reflective surface 22b is a paraboloid of revolution of which top is its end P.

Recording, reading and erasing by use of the prism 22 and the near field light N are carried out in the processes described in connection with the first embodiment, and the same effects can be obtained. The detailed description is omitted here.

In order to carry out recording, reading and erasing by use of a propagated light beam, a light source 35, a collimator lens (not shown), a polarizing beam splitter 37, a λ/4 wavelength plate 38, an optical detector 39 and a mirror 34 are provided. Also, the prism 22 has a convex incident surface 22a'.

A light beam of a wavelength $\lambda_4$ emitted from the light source 35 is changed into a parallel bundle of rays by the collimator lens and passes through the polarizing beam splitter 37 and the $\lambda/4$ wavelength plate 38. Thereafter, the beam is reflected by the mirror 34 and is incident to the prism 22 vertically through the incident surface 22a'. As FIG. 11 shows, this incident light is refracted and converged in the prism 22 and is emergent from the prism 22 through the emergent surface 22c as a propagated light beam T. The emergent light beam, of which spot diameter is $s_1$, irradiates the recording layer of a recording medium and forms a recording pit.

The spot diameter $s_1$ of the propagated light beam T is larger than the spot diameter s of the near field light N. Referring to FIG. 11, if the light source 35 emits a light beam of 780 nm (wavelength $\lambda_4$=780 nm) at an emergent angle $\theta$ of 30°, the spot diameter $s_1$ of the propagated light beam T emergent from the prism 22 is approximately 780 nm. The spot diameter s of the near field light N is, under the conditions specified in the first embodiment, approximately 370 nm. Thus, the spot diameter $s_1$ is larger than the spot diameter s.

In a reading process by use of the propagated light beam, the light beam T is reflected by the recording layer, and the reflected light is incident to the prism 22 and is emergent from the prism 22 through the incident surface 22a'. The light is, thereafter, reflected by the mirror 34, deflected by the $\lambda/4$ wavelength plate 38 and reflected by the polarizing beam splitter 37. Then, the light is received by the optical detector 39.

The wavelengths $\lambda_4$ of the light emitted from the light source 35 may be equal to or different from the wavelength $\lambda$ of the light emitted from the light source 15. If the wavelength $\lambda_4$ is equal to the wavelength $\lambda$, either the light source 35 or the light source 15 and the corresponding collimator lens can be omitted. In this case, light emitted from the remained light source is split to travel to the polarizing beam splitter 17 and to the polarizing beam splitter 37.

Figure 9:
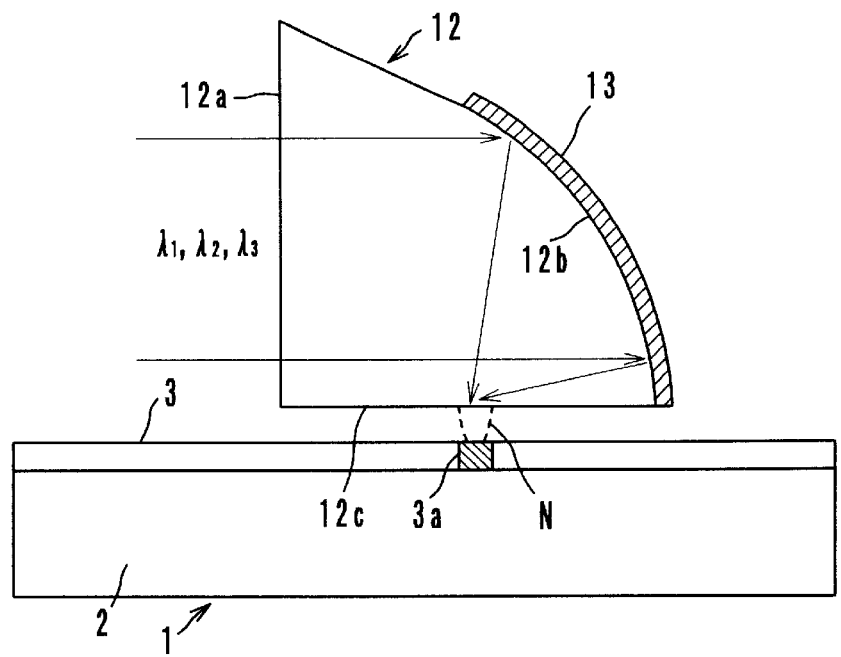
FIG. 9 is a schematic structural view of the main part of an optical head device which is a second embodiment of the present invention.

In the third embodiment, the modifications shown by FIGS. 6, 7 and 8 can be adopted. Further, as FIG. 9 shows, the wavelength of the light emitted from the light source may be changeable between $\lambda_1$, $\lambda_2$ and $\lambda_3$.

Figure 12:
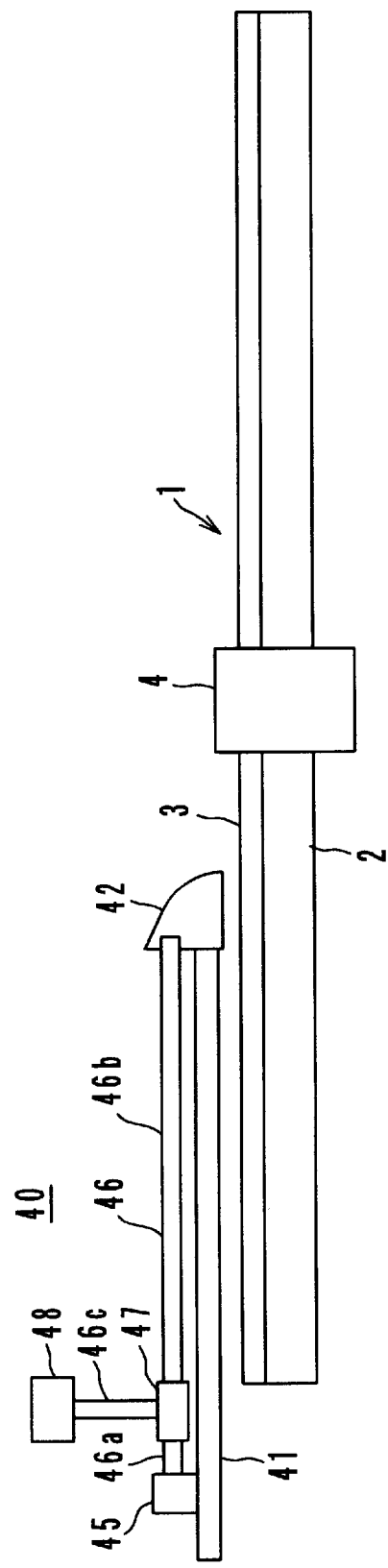
FIG. 12 is a schematic structural view of an optical head device which is a fourth embodiment of the present invention.
Figure 13:
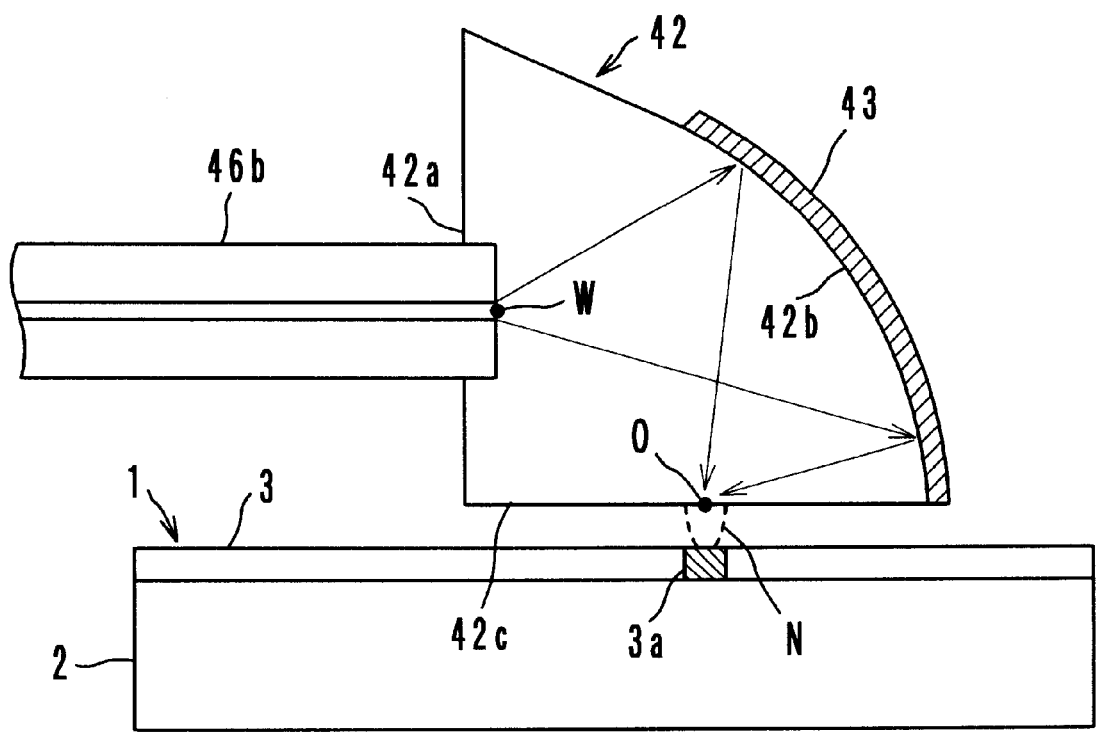
FIG. 13 is an illustration which shows an occurrence of near field light in the fourth embodiment.

Fourth Embodiment; See FIGS. 12 and 13

The fourth embodiment is an optical head device 40 which is a combination of a prism 42 and an optical waveguide 46. The optical waveguide 46 are composed of three optical fibers 46a, 46b and 46c (of a conventional type of which core is covered with cladding) which are provided on an arm 41, and the respective one ends of the optical fibers 46a, 46b and 46c are connected to an optical diverging circuit 47. The other end of the optical fiber 46a is connected to a light source 45; the other end of the optical fiber 46b is connected to an incident surface 42a of the prism 42; and the other end of the optical fiber 46c is connected to an optical detector 48. As the optical fibers 46a, 46b and 46c, multimode fibers which have a core diameter of 50 $\mu$m, a cladding diameter of 125 $\mu$m and a numerical aperture of 0.2 are used.

The light source 45 comprises a light emitting source, such as a laser diode, a light emitting diode or the like, a collimator lens and an objective lens. Collimated light of a specified wavelength is incident to the optical fiber 46a. The prism 42 is basically of the same structure and the same materials as the prism 12, and on an internal reflective surface 42b, a reflective film 43 is formed (see FIG. 13).

In a recording process, light of a wavelength $\lambda$ emitted from the light source 45 is incident to the optical fiber 46a and further incident to the prism 42 via the optical diverging circuit 47 and the optical fiber 46b. The incident light is reflected by the reflective surface 42b once and converged on an emergent surface 42c of the prism 42. Then, the light effuses through the emergent surface 42c as a near field light N. The gap between the emergent surface 42c and the recording layer 3 of the recording medium 1 is set not more than ¼ of the wavelength $\lambda$ (50 to 100 nm), and the near filed light N irradiates the recording layer 3 and forms a recording pit 3a.

The internal reflective surface 42b of the prism 42 is an ellipsoid of revolution which has two focal points on the beam waist W of the light beam emitted from the optical fiber 46b and on the converging point O. The light beam emergent from the optical fiber 46b is a divergent bundle of rays, and the reflective surface 42b which is an ellipsoid of revolution has a function of correcting spherical aberration of a divergent bundle of rays.

In a reading process, the near field light N is reflected on the recording layer 3 and travels backward in the prism 42. Then, the reflected light is converged on the end surface of the optical fiber 46b. This reflected light travels to the optical diverging circuit 47 through the optical fiber 46b and is directed to the optical detector 48 by the optical fiber 46c. Thereby, a reading signal of the recording pit 3a is obtained. The power of the light source 45 for reading may be weaker than the power for recording. Erasing is carried out in a similar process; the wavelength of light, however, may be required to be changed.

The fourth embodiment brings the same effects as the first embodiment. Moreover, because the prism 42 is connected to the optical waveguide 46, the optical head device 40 is stable against vibration of the arm 41 due to vibration of the recording medium 1 and external vibration and shock, and the optical axis does not shift, which secures stable recording/reading performance.

Further, in the fourth embodiment, a minuscule opening may be made on the converging point O of the emergent surface 42c as FIG. 8 shows. As the optical waveguide, a thin film waveguide of a ZnO layer can be used as well as optical fibers.

Fifth Embodiment; See FIG. 14

The fifth embodiment is a compatible optical head device like the third embodiment and uses an optical waveguide. The fifth embodiment has a prism 52 which is of the same structure as the prism 22 shown by FIG. 11. The prism 52 has incident surfaces 52a, 52a', an internal reflective surface 52b and an emergent surface 52c. In the fifth embodiment, the optical system for a near field light is of the same structure as the fourth embodiment, and recording and reading are carried out in the same processes as described in the fourth embodiment.

The optical system for a propagated light beam is basically of the same structure of the optical system for a near field light. The optical system for a propagated light beam comprises a light source 55, an optical waveguide 56 composed of optical fibers 56a, 56b and 56c, an optical diverging circuit 57 and an optical detector 58. Light emitted from the light source 55 travels through the optical fiber 56a, the optical diverging circuit 57 and the optical fiber 56b and is incident to the prism 52 vertically through the incident surface 52a'. Then, the propagated light is emergent from the prism 52 through the emergent surface 52c and irradiates a recording layer and forms a recording pit.

In a reading process, the propagated light is reflected by the recording layer and travels backward to the optical diverging circuit 57. Then, the reflected light is directed to the optical detector 58 via the optical fiber 56c.

In the fifth embodiment, one light source may be used as the light sources 45 and 55 of the near field light and of the propagated light as has been described in connection with the third embodiment.

Sixth Embodiment; See FIGS. 15, 16 and 17

The first through fifth embodiment are optical head devices of a single internal reflection type. The sixth embodiment is an optical head device of a double internal reflection type.

In FIGS. 15 and 16, the number 101 denotes a recording medium, and the number 110 denotes an optical head device. The recording medium 101 has a recording layer 103 on a substrate 102 and can be driven to rotate on a rotary driving shaft 104. On the recording layer 103, a protective layer may be formed.

In the optical head device 110, an optical head has a prism 112 at the end of an arm 111. On the arm 111, a light source 115, a collimator lens 116 (see FIG. 16), a polarizing beam splitter 117, a λ/4 wavelength plate 118 and an optical detector 119 are provided.

Figure 17:
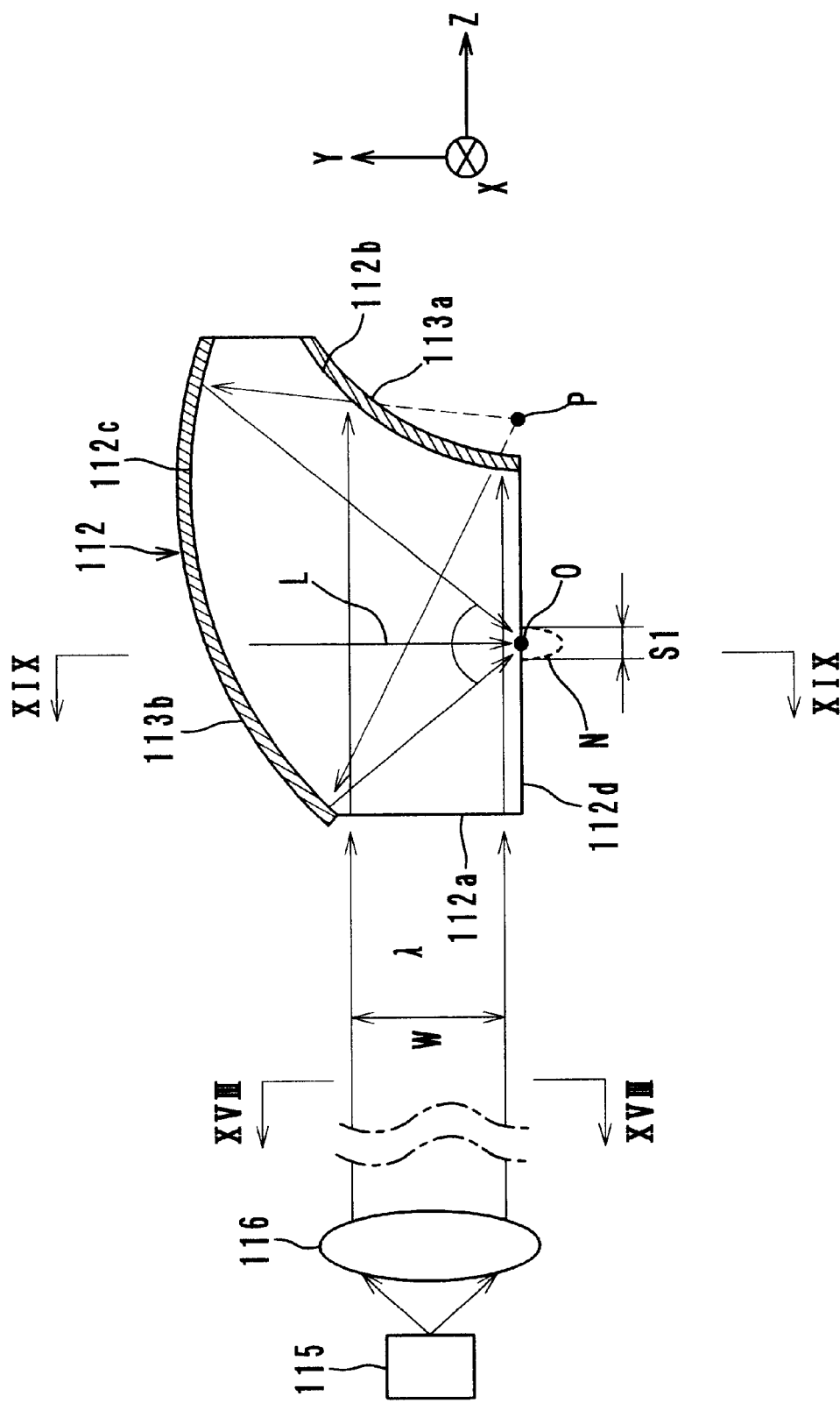
FIG. 17 is an illustration which shows travel of light in a prism in the sixth embodiment.

The prism 112 has an incident surface 112a, a first internal reflective surface 112b, a second internal reflective surface 112c and an emergent surface 112d. The incident surface 112a and the emergent surface 112d are plane. Referring to FIG. 17, the internal reflective surfaces 112b and 112c are described. In FIG. 17, the point P is the intersection of lines which are extended in the reverse direction to the side rays of the light reflected by the first internal reflective surface 112b, and the point O is a converging point on which the light reflected by the second internal reflective surface 112c is converged. The first internal reflective surface 112b is a paraboloid of revolution which has a focal point on the point P, and the second internal reflective surface 112c is an ellipsoid of revolution which has two focal points on the point P and on the point O. Further, the paraboloid of revolution 112b and the ellipsoid of revolution 112c are so designed that neither of the respective axes of rotation symmetry intersects the center of the bundle of rays emitted from the light source 115. The internal reflective surfaces 112b and 112c are made by forming reflective films 113a and 113b (for example, Au, Ag, Cu, Cr, Ni or Al) thereon.

The paraboloid of revolution 112b and the ellipsoid of revolution 112c are expressed by the following expression in the XYZ rectangular coordinate system.

$$Z=cY^2/\{1+(1-\epsilon c^2 Y^2)^{1/2}\}$$

c: curvature

In the expression, when $\epsilon=0$, it expresses the paraboloid of revolution 112b, and when $\epsilon=0.91$, it expresses the ellipsoid of revolution 112c.

The prism 112 is made of, for example, glass such as LaSF, LaF, BaSF, etc. The prism 112 is a high-refractive medium and at least has a higher refractive index than the medium which is in contact with the emergent surface 112d.

The light source 115 may have a laser diode, a light emitting diode or any other light emitting source.

First, a recording process is described. Light of a wavelength λ emitted from the light source 115 is changed into a parallel bundle of rays by the collimator lens 116. Then, the light passes through the polarizing beam splitter 117 and the λ/4 wavelength plate 118 and is incident to the prism 112 through the incident surface 112a. This incident light is reflected on the reflective surface 112b once and on the reflective surface 112c once, and is converged on the emergent surface 112d. Then, the light effuses through the emergent surface 112d as a near field light (in other words, optical near field) N. At this time, the center ray L of the bundle of rays converging on the emergent surface 112d of the prism 112 is perpendicular to the emergent surface 112d. The gap between the recording layer 103 of the recording medium 101 and the emergent surface 112d is set not more than ¼ of the wavelength λ (50 to 100 nm), and the near field light N irradiates the recording layer 103 and forms a recording pit 103a.

The spot diameter S1 (see FIG. 17) of the near field light N is substantially equal to that of the light beam as if still traveling in the prism and is substantially 1/n (n: refractive index of the prism) of the spot diameter of the light when traveling in the air. Referring to FIG. 17, if the wavelength λ of the incident light is 650 nm, if the refractive index n of the prism 112 is 1.8, if the diameter W of the incident beam (the parallel bundle of rays) is 1 mm and if the prism 112 has a height of 2.1 mm and a length of 3.5 mm, the spot diameter S1 of the near field light N is approximately 260 nm, and the recording density is approximately 7 Gbit/inch$^2$, which is extremely high.

Because the first internal reflective surface 112b is a paraboloid of revolution which has a focal point on the point P and because the second internal reflective surface 112c is an ellipsoid of revolution which has two focal points on the point P and on the point O, these surfaces 112b and 112c have a function of correcting spherical aberration of a parallel bundle of rays.

Next, a reading process is described. The near field light N irradiates the recording pit 3a of the recording layer in the way described in connection with the recording process and is reflected thereon, and the reflected light travels backward. The reflected light is emergent from the prism 112 through the incident surface 112a and passes through the λ/4 wavelength plate 118 again. Then, the light is reflected by the beam splitter 117 and received by the optical detector 119. Thereby, a reading signal of the recording pit 103a is obtained. Because of the λ/4 wavelength plate 118, the reflected light is directed to the optical detector 119 without returning to the light source 115, whereby a reading signal in good conditions can be obtained. The power of the light source 115 for reading may be weaker than that for recording. Erasing is carried out in a similar process; if necessary, however, the wavelength of light may be changed.

In the sixth embodiment, light is incident to the prism 112 to be reflected twice therein and is converged on the emergent surface 112d. Then, recording, reading and erasing are carried out by the resultant near field light N. The head is composed of the prism 112, and neither a convergent lens nor a reflective mirror is necessary. Thus, the head is small and light and can be floated based on the air lubricating principle. Since neither a convergent lens nor a reflective mirror is necessary, the freedom of the design of the optical system is large.

The Shape of the Incident Beam Spot; See FIGS. 18 and 19

The beam spot S incident to the prism 112 is preferably elliptic as shown by FIGS. 18 and 19. FIG. 18 is the section cut along the line "X VIII—X VIII" in FIG. 17, and FIG. 19 is the section cut along the line "XIX—XIX" in FIG. 17. The longer axis of the beam spot S extends in the X direction, and the prism 112 has a larger numerical aperture in the X direction. Accordingly, the spot diameter S2 (see FIG. 19) on the converging point O in the X direction is larger than the spot diameter S1 in the Z direction (see FIG. 17).

Referring to FIG. 18, if the longer axis a and the shorter axis b of the incident beam spot S is 1.5 mm and 1 mm, respectively, if the wavelength λ of the incident beam is 650 nm, the refractive index n of the prism 112 is 1.8 and if the prism 112 has a height of 2.1 mm and has a length of 3.5 mm, the spot diameter S1 in the Z direction is approximately 260 nm, while the spot diameter S2 in the X direction is approximately 220 nm. Accordingly, if the X direction corresponds to the circular direction (recording direction) of the recording medium 101, the recording density is improved.

Modifications of the Sixth Embodiment

Figure 20:
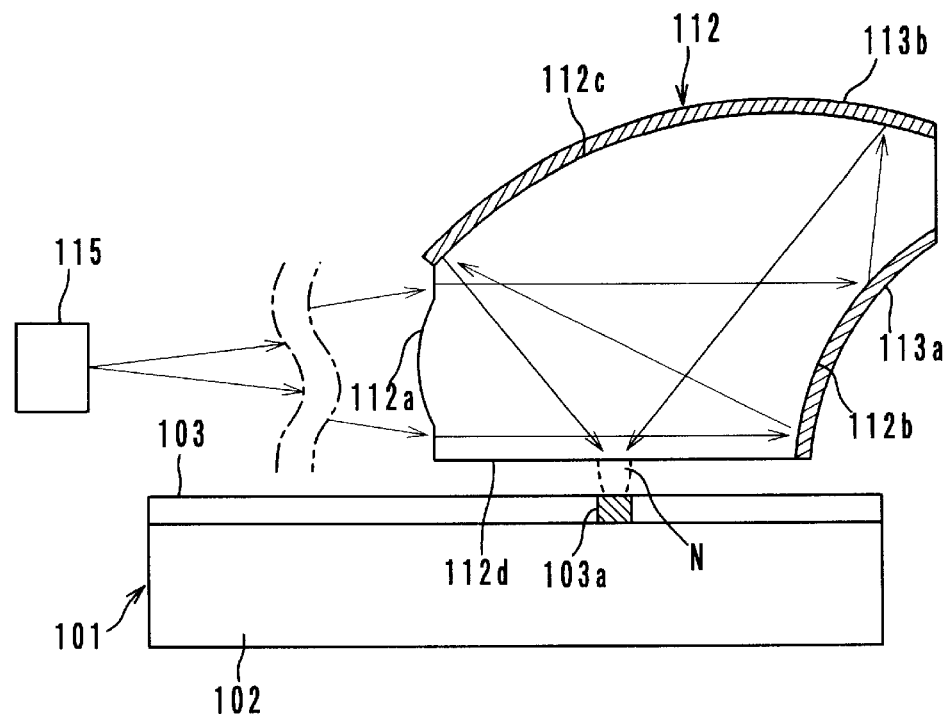
FIG. 20 is a schematic structural view of a modification of the sixth embodiment.

FIG. 20 shows a modification of the sixth embodiment. In this modification, the collimator lens 116 shown in FIG. 16 is omitted, and a divergent bundle of rays is incident to the prism 112. The incident surface 112a of the prism 112 is convex and changes the incident divergent light into a parallel bundle of rays.

Figure 21:
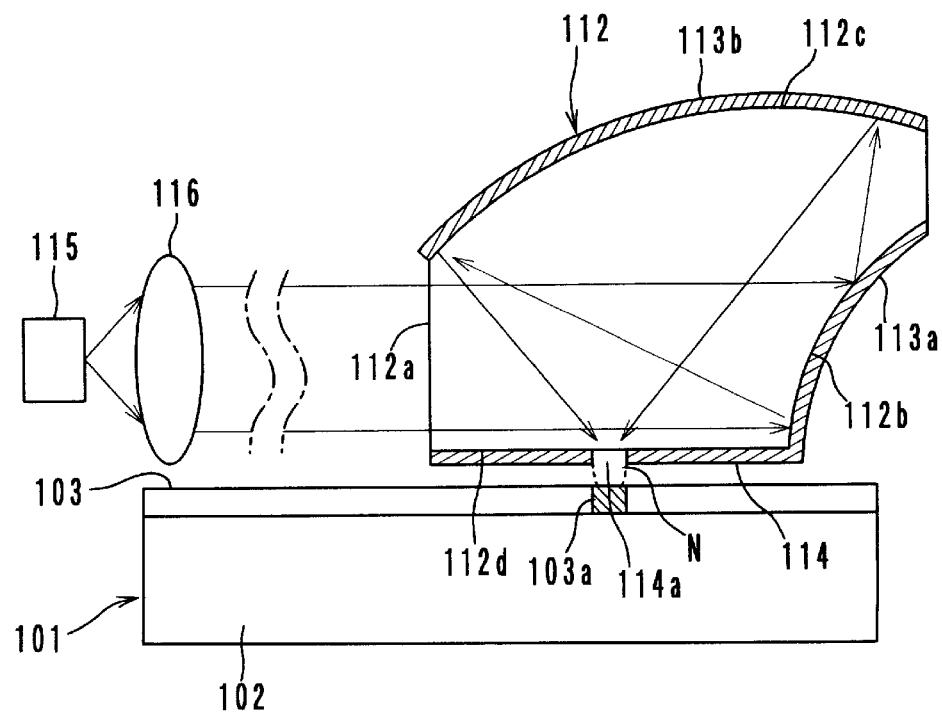
FIG. 21 is a schematic structural view of another modification of the sixth embodiment.

FIG. 21 shows another modification of the sixth embodiment. In this modification, a minuscule opening 114a is made at the converging point on the emergent surface 112d of the prism 112. Specifically, a light shutter film 114 is covered on the emergent surface 112d, and at the converging point, a minuscule opening 114a is made in the light shutter film 114. The light shutter film 114 may be made of the same material of the reflective films 113a and 113b. By providing the minuscule opening 114a, the spot of the near filed light N can be made smaller, which permits higher-density recording.

Seventh Embodiment; See FIG. 22

In the seventh embodiment, for recording, reading and erasing, light of a wavelength $\lambda_1$, light of a wavelength of $\lambda_2$ and light of a wavelength of $\lambda_3$ are used, respectively. The seventh embodiment is of the same structure as the sixth embodiment. The light source 115 has light emitting sources which emit light of a wavelength $\lambda_1$, light of a wavelength of $\lambda_2$ and light of a wavelength of $\lambda_3$, respectively and switches these light emitting sources for recording, reading and erasing to emit the light of the respective wavelengths toward the prism 112.

In this case, the recording layer 103 is preferably a photochromic medium. As a specific example, 1,2-bis (2,4, 5-trimethyl-3-thienyl)-cis-1,2-dicyanoethene (trade name, made by Tokyo Chemical Industry Co., Ltd.) can be named. For such a recording layer 103, light of 355 nm is used for recording; light of 532 nm is used for reading; and light of 780 nm is used for erasing.

Recording, reading and erasing in the seventh embodiment are carried out in the same processes as described in the sixth embodiment except that it is necessary to switch the wavelength of light.

Eighth Embodiment; See FIGS. 23 and 24

Figure 23:
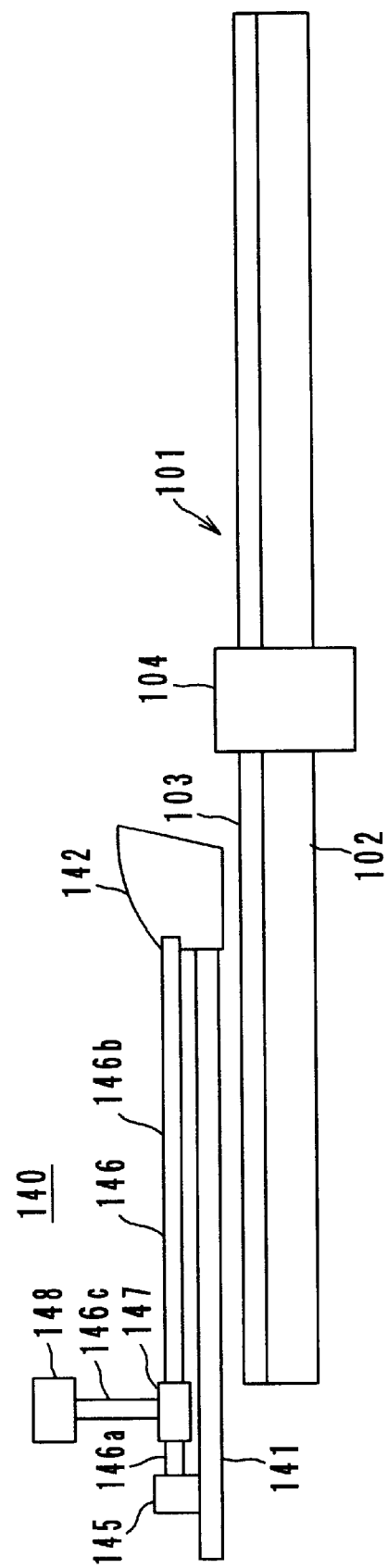
FIG. 23 is a schematic structural view of an optical head device which is an eighth embodiment of the present invention.
Figure 24:
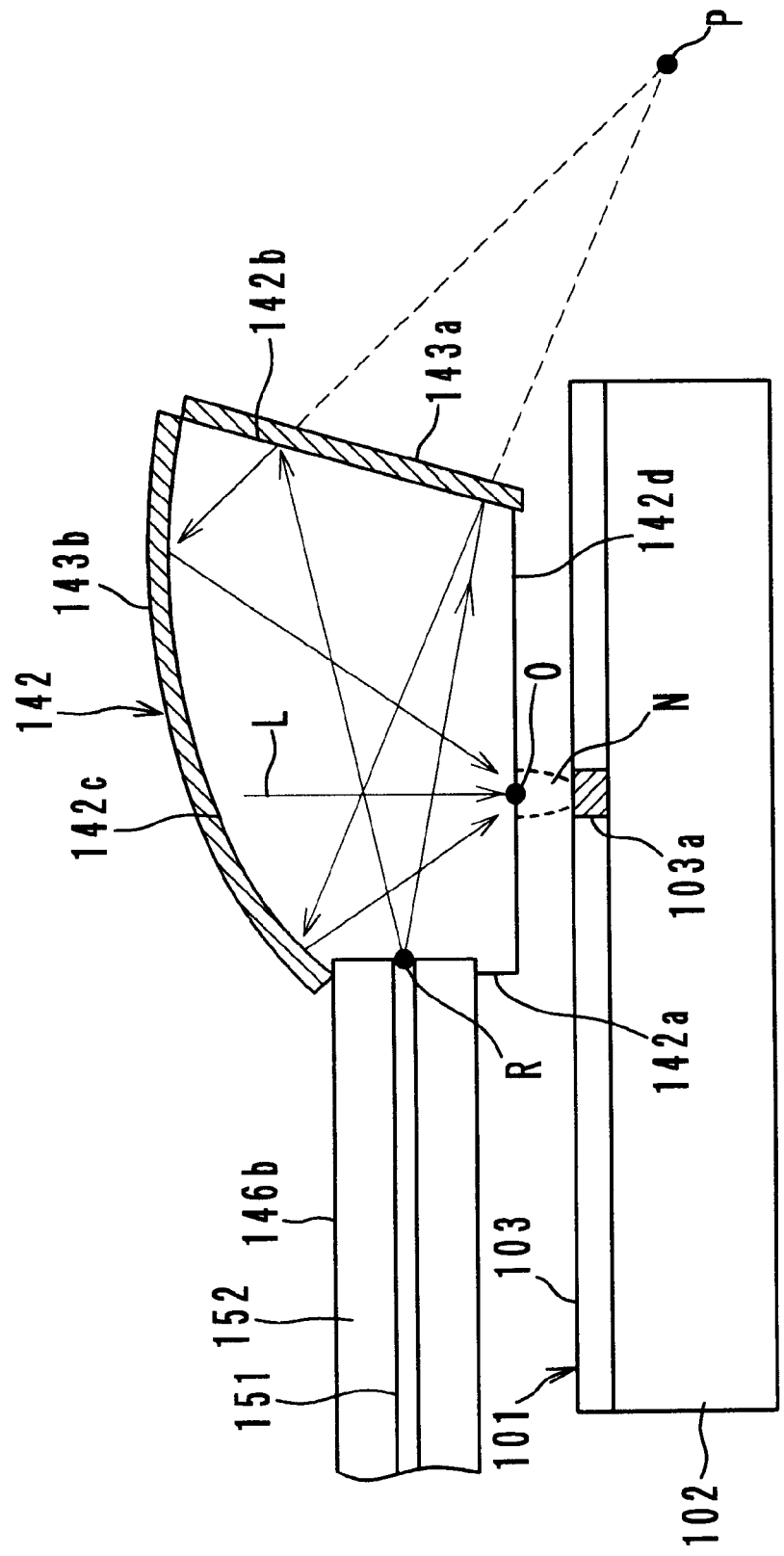
FIG. 24 is an illustration which shows travel of light in a prism in the eighth embodiment.

As FIGS. 23 and 24 show, the eighth embodiment is an optical head device 140 which is a combination of a prism 142 and an optical waveguide 146. The optical waveguide 146 are composed of three optical fibers 146a, 146b and 146c (of a conventional type of which core 151 is covered with cladding 152) which are provided on an arm 141, and the respective one ends of the optical fibers 146a, 146b and 146c are connected to an optical diverging circuit 147. The other end of the optical fiber 146a is connected to a light source 145; the other end of the optical fiber 146b is connected to an incident surface 142a of the prism 142; and the other end of the optical fiber 146c is connected to an optical detector 148. As the optical fibers 146a, 146b and 146c, single-mode fibers which have a core diameter of 4 μm, a cladding diameter of 125 μm are used.

The light source 145 comprises a light emitting source, such as a laser diode, a light emitting diode or the like, a collimator lens and an objective lens. Collimated light of a specified wavelength is incident to the optical fiber 146a. The prism 142 has an incident surface 142a, a first internal reflective surface 142b, a second internal reflective surface 142c and an emergent surface 142d. The incident surface 142a, the first internal reflective surface 142b and the emergent surface 142d are plane.

Referring to FIG. 24, the second internal reflective surface 112c is described. In FIG. 24, the point P is the intersection of lines which are extended in the reverse direction to the side rays of the light reflected by the first internal reflective surface 142b, that is, the mirror image point of the emergent point R of the optical fiber 146b in connection with the first internal reflective surface 142b. The point O is a converging point on which the light reflected by the second internal reflective surface 112c is converged. The second internal reflective surface 142c is an ellipsoid of revolution which has two focal points on the point P and on the point O. Further, the ellipsoid of revolution 142c is so designed that its axis of rotation symmetry does not intersect the center of the bundle of rays emitted from the light source 145. The internal reflective surfaces 142b and 142c are made by forming reflective films 143a and 143b.

In a recording process, light of a wavelength λ emitted from the light source 145 is incident to the optical fiber 146a and further incident to the prism 142 via the optical diverging circuit 147 and the optical fiber 146b. The incident light is reflected by the reflective surface 142b once and reflected by the reflective surface 142c once. Then, the light is converged on the emergent surface 142d of the prism 142, and the light effuses through the emergent surface 142d as a near field light N. At this time, the center ray L of the bundle of rays converging on the emergent surface 142d of the prism 142 is perpendicular to the emergent surface 142d. The gap between the emergent surface 142d and the recording layer 103 of the recording medium 101 is set not more than ¼ of the wavelength λ (50 to 100 nm), and the near filed light N irradiates the recording layer 103 and forms a recording pit 103a.

The internal reflective surface 142c of the prism 142 is an ellipsoid of revolution which has two focal points on the emergent point R of the optical fiber 146b, that is, the beam waist W of the light beam emitted from the optical fiber 146b and on the converging point 0. The light beam emergent from the optical fiber 146b is a divergent bundle of rays, and the reflective surface 142c which is an ellipsoid of revolution has a function of correcting spherical aberration of a divergent bundle of rays.

In a reading process, the near field light N is reflected on the recording layer 103 at the recording pit 103a and travels backward in the prism 142. Then, the reflected light is converged on the end surface of the optical fiber 146b. This reflected light travels to the optical diverging circuit 147 through the optical fiber 146b and is directed to the optical detector 148 by the optical fiber 146c. Thereby, a reading signal of the recording pit 103a is obtained. The power of the light source 145 for reading may be weaker than the power for recording. Erasing is carried out in a similar process; the wavelength of light, however, may be required to be changed.

The eighth embodiment brings the same effects as the sixth embodiment. Moreover, because the prism 142 is connected to the optical waveguide 146, the optical head device 140 is stable against vibration of the arm 141 due to vibration of the recording medium 101 and external vibration and shock, and the optical axis does not shift, which secures stable recording/reading performance.

Further, in the eighth embodiment, a modification shown by FIG. 20 can be adopted. Also, a minuscule opening may be made on the converging point O of the emergent surface 142d as FIG. 21 shows. Further, as FIG. 22 shows, light of a wavelength $\lambda_1$, light of a wavelength $\lambda_2$ and light of a wavelength $\lambda_3$ may be used. As the optical waveguide, a thin film waveguide of a ZnO layer can be used as well as optical fibers.

In order to maintain the gap between the optical head and the recording medium, not only an air floating method but also any other methods can be adopted. The light source and the optical elements may be of any other structure, and the prism may be of any other shape. The emergent surface of the prism may be convex toward the recording medium so that positioning of the optical head in a closed place to the recording medium will be easier.

In the optical head devices 110 and 140 of a double internal reflection type, although in the sixth through eighth embodiments, the light converges on the converging point O of the emergent surface of the prism in such a way that the center ray L is perpendicular to the emergent surface of the prism, it is satisfactory even if the angle of the center ray L shifts within ±10° from the vertical direction. If the angle of the center ray L shifts more, the quantity of light transmitting through the minuscule opening may be lowered, and near field light distribution may be out of order, which are undesirable.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An optical head device comprising:
   a light source which emits a light beam; and
   a prism which comprises:
     a first surface through which a light beam advancing along a first direction enters into the prism;
     a second surface for reflecting and converging the light beam entered through the first surface, the light beam reflected and converged by the second surface advancing along a second direction different from the first direction;
     a third surface having an area on or in vicinity of which the light beam reflected and converged by the second surface forms a beam spot; and
     a light shutter layer, provided on the third surface, having a minuscule opening formed at the area of the third surface, wherein
     the minuscule opening is smaller than the beam spot, and
     the light shutter layer except the minuscule opening prevents the light beam from passing through the third surface.

2. The optical head device according to claim 1, wherein the light beam is reflected in the prism once.

3. The optical head device according to claim 2, wherein the second surface has a curved surface for geometrically converging the light beam.

4. The optical head device according to claim 3, wherein a shape of the second surface is a paraboloid of revolution.

5. The optical head device according to claim 3, wherein a shape of the second surface is an ellipsoid of revolution.

6. The optical head device according to claim 1, wherein the light beam entering the prism has an elliptic beam spot.

7. The optical head device according to claim 1, wherein the prism further comprises a reflective film provided on the second surface.

8. A prism comprising:
   a first surface through which a light beam advancing along a first direction enters into the prism;
   a second surface for reflecting and condensing the light beam entered through the first surface, the light beam reflected and condensed by the second surface advancing along a second direction different from the first direction;
   a third surface having an area on or in vicinity of which the light beam reflected and converged by the second surface forms a beam spot; and
   a light shutter layer, provided on the third surface, having a minuscule opening formed at the area of the third surface, wherein
   the minuscule opening is smaller than the beam spot, and
   the light shutter layer except the minuscule opening prevents the light beam from passing through the third surface.

9. The prism according to claim 8, wherein the light beam is reflected in the prism once.

10. The prism according to claim 9, wherein the second surface has a curved surface for geometrically converging the light beam.

11. The prism according to claim 10, wherein a shape of the second surface is a paraboloid of revolution.

12. The prism according to claim 10, wherein a shape of the second surface is an ellipsoid of revolution.

13. The prism according to claim 8, wherein the light beam entering to the prism has an elliptic beam spot.

14. The prism according to claim 8, wherein the prism further comprises a reflective film provided on the second surface.

* * * * *